Sept. 22, 1970  E. C. JOHNS  3,529,632
COMPOSITE TUBING

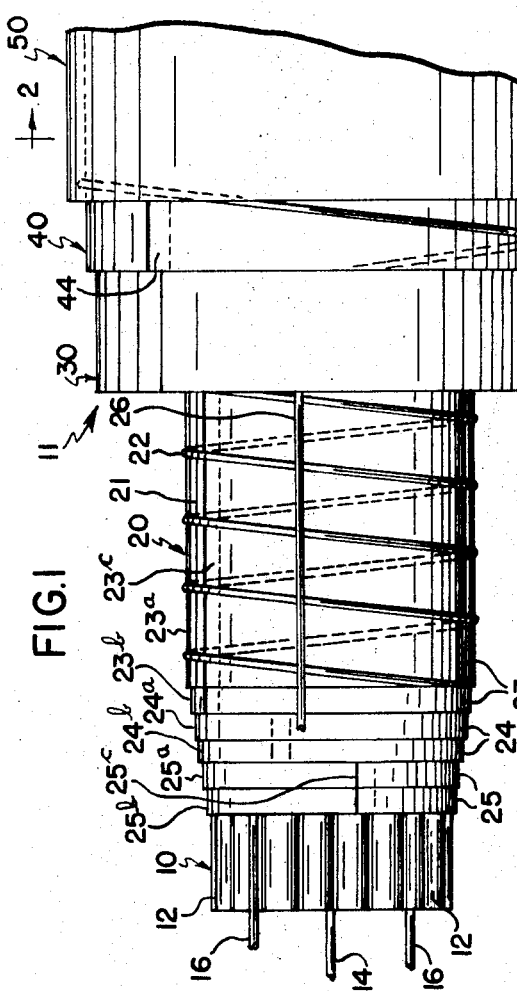
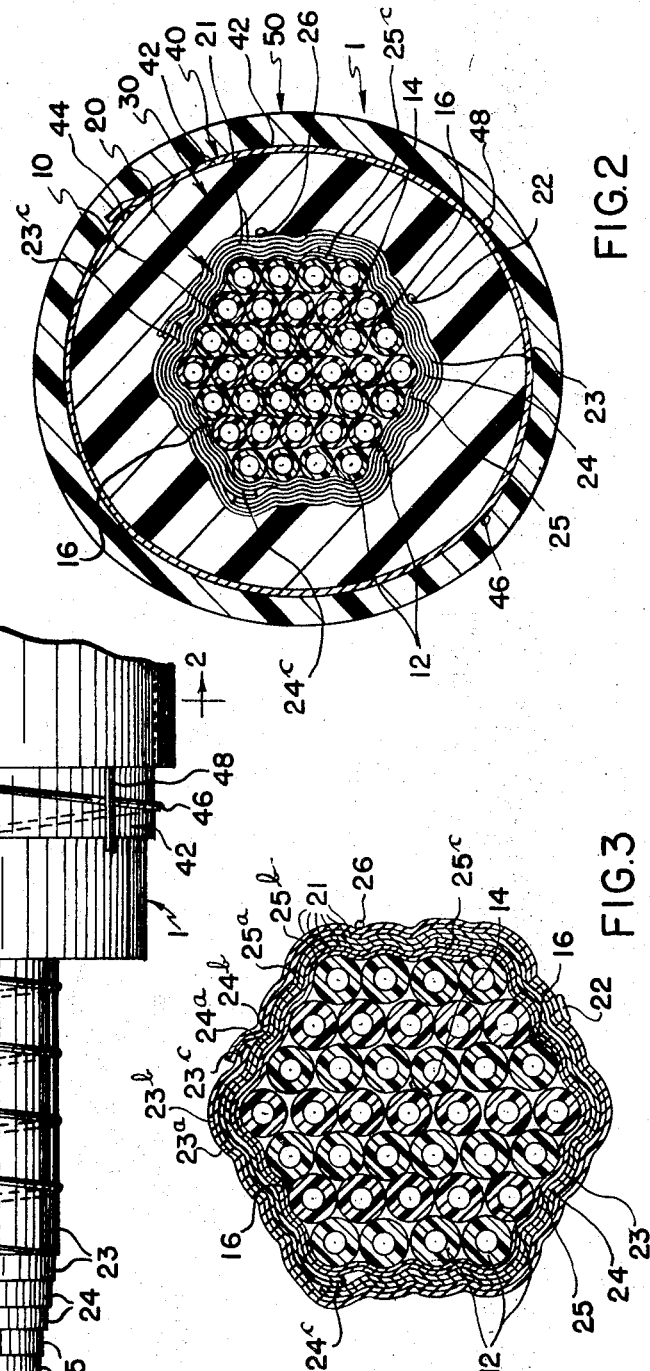

Filed Nov. 21, 1968  2 Sheets-Sheet 2

INVENTOR.
EDWARD C. JOHNS
BY
*Teare, Teare & Sammon*
ATTORNEYS

United States Patent Office 3,529,632
Patented Sept. 22, 1970

3,529,632
COMPOSITE TUBING
Edward C. Johns, Streetsboro, Ohio, assignor to Samuel Moore and Company, Mantua, Ohio, a corporation of Ohio
Filed Nov. 21, 1968, Ser. No. 777,720
Int. Cl. F16l *9/18*
U.S. Cl. 138—111                    16 Claims

ABSTRACT OF THE DISCLOSURE

A flexible composite tubing and method for making the same including a polymeric core tube bundle and an outer insulating and protective jacket disposed around the bundle and providing a thermal control gradient therefor. The jacket includes an inner thermo-barrier layer of a substantially heat infusible material applied longitudinally in radially wrapped relation around the core tube bundle, an intermediate thermo-shock barrier layer of a substantially heat fusible material, an outer thermo-barrier layer of a substantially heat refractory material applied longitudinally in radially wrapped relation around the inner thermo-barrier layer, and an outer polymeric sheath disposed around the outer thermo-barrier layer and providing a protective cover for the tubing.

BACKGROUND OF THE INVENTION

The present invention relates to composite tubing, and more particularly relates to an improved construction for a flexible composite tubing and method for making the same for the conveyance of fluid pressure, such as liquid or gases, of the type for use in transmitting signals, control impulses and/or measurements, such as in instrument control bundles or the like.

Heretofore, various types of harness or bundle arrangements have been provided for transmitting process signals by fluid pressure, such as air or other gaseous carriers, from a control point to some remote point where instruments and/or regulators log the process and/or control the operation of the installation. Moreover, such arrangements are employed in a wide variety of applications and under various environmental conditions during normal usage thereof. In many installations, the reliability of the bundle when subjected to intermittent high temperatures, such as flash fires, welding sparks or other conditions promoting temperature increases in the bundle, is a major problem. This is of particular importance when the bundle is made of an all-plastic construction so as to incorporate optimum lightweight and flexibility characteristics while maintaining a relatively high performance level. It is essential, therefore, that such arrangements incorporate high safety and service life so as to resist such temperature conditions over extended periods of time, particularly under extreme emergency conditions.

In one prior arrangement, the bundle was of a semi-flexible construction which included a number of metallic conductive tubes wrapped with an insulating tape and covered with an outer metallic sheath. Such rigid bundle constructions, however, are not satisfactory due to the considerable distances oftentimes required to be spanned by the tubing or in applications requiring a number of turns or bends to complete the installation. In addition, such prior arrangements are not only costly to produce and time consuming to install, but are generally heavy and difficult to handle and/or ship, particularly when fabricated to longer lengths.

More recently, a tubing bundle has been employed wherein the inner core tubes are of an all-plastic construction. However, such arrangements have not been entirely satisfactory for many applications, particularly under the aforementioned environmental conditions. In such arrangements, the outer covering jacket for the plastic core tubes has not afforded an effective thermo-barrier to resist increased temperatures over longer periods of time to enable the bundle to have a relatively long service life and control. Furthermore, such prior arrangements have not incorporated, in addition to an effective thermo-barrier, sufficient shock-barrier characteristics which not only cushion the shock effects from extended usage, but which also enhances the thermo-barrier characteristics of the tubing without a reduction in flexibility and/or without reducing the performance level of the tubing.

Typical of a tubing bundle known in the prior art is disclosed in the U.S. Pat. No. 2,578,280 to Bernard dated Dec. 11, 1951.

SUMMARY OF THE INVENTION

A flexible composite tubing and method for making the same having improved thermo and shock-barrier characteristics comprising, a polymeric core tube bundle adapted for transmitting fluid pressure and an outer insulating and protective jacket disposed around the core tube bundle and providing a thermal control gradient to insulate and dissipate heat energy and shock effects away from the core tube bundle. The jacket includes an inner thermo-barrier layer applied longitudinally in generally radially lapped relation around the core tube bundle. The inner layer is preferably made from a generally low density on high bulk material which has relatively high thermal insulation characteristics at a relatively low temperature range. An intermediate thermo-shock barrier layer is disposed around the inner thermo-barrier layer. The intermediate layer is preferably made of a relatively thick polymeric material having shock absorbent and relatively low temperature phase transition heat absorbent characteristics. An outer thermo-barrier layer is applied longitudinally in radially wrapped relation around the intermediate layer. The outer layer is preferably made from a relatively thin insulating material having relatively high refractory and flame resistant characteristics at a relatively high temperature range as compared to the inner and intermediate layers. An outer polymeric sheath is disposed in encompassing relation around the outer thermo-barrier layer and provides a protective cover for the bundle.

In operation and when subjected to intermittent high temperature conditions, the outer jacket acts as a thermal control gradient to progressively restrict the flow of heat energy toward the interior of the polymeric core tube bundle. For example, at relatively high temperatures, such as to 3000° F., the outer thermo-barrier layer acts as a primary refractory insulation shield to prevent a high velocity flame from ablating the intermediate thermo-shock barrier layer and to prevent exposure of the inner thermo-barrier layer to such open flame. The intermediate layer preferably being made from a relatively low temperature phase material undergoes a physical state change from a solid to a liquid to absorb significant quantities of heat energy from the outer thermo-barrier layer while at the same time acting as a resilient cushion to absorb the mechanical shock effects, which may be applied to the tubing. The inner thermo-barrier layer adjacent the core tube bundle incorporates high thermal insulation characteristics at a relatively low temperature range, such as up to 500° F., and acts as a secondary insulation to absorb heat energy from the intermediate thermo-shock barrier layer and also acts as a mechanical barrier shield to prevent the flow of melted material from such intermediate layer in a direction toward the core tube bundle.

By the foregoing arrangement, there is provided an improved construction for a composite tubing bundle which incorporates many advantages over heretofore known types of devices for similar applications. The core tube bundle is of a flexible, all-plastic construction capable of transmitting relatively high internal pressures with a novel insulating and protective jacket which maintains the performance level of the tubing bundle under increased temperature conditions and for longer periods of time. The maintenance of such performance level extends the service life and control for measuring and/or regulating equipment under extreme emergency conditions, reduces the cost of equipment shut-down and enables the maintenance of emergency controls for the purpose of salvaging other equipment or other property when subjected to such emergency conditions. In addition, the present arrangement is of a compact, lightweight construction which can be quickly and economically produced and utilized with a minimum of time and effort and for a wide variety of environmental applications. The present arrangement may also be used for jacketing a core bundle of wires or the like.

BRIEF DESCRIPTION OF THE DRAWINGS

FIG. 1 is a fragmentary side elevation view, partially cut away of the composite tubing made in accordance with the invention;

FIG. 2 is a vertical section view taken along the line 2—2 of FIG. 1;

FIG. 3 is an enlarged fragmentary section view of the tubing shown in FIG. 2;

DESCRIPTION OF THE PREFERRED EMBODIMENTS

Figure 4:
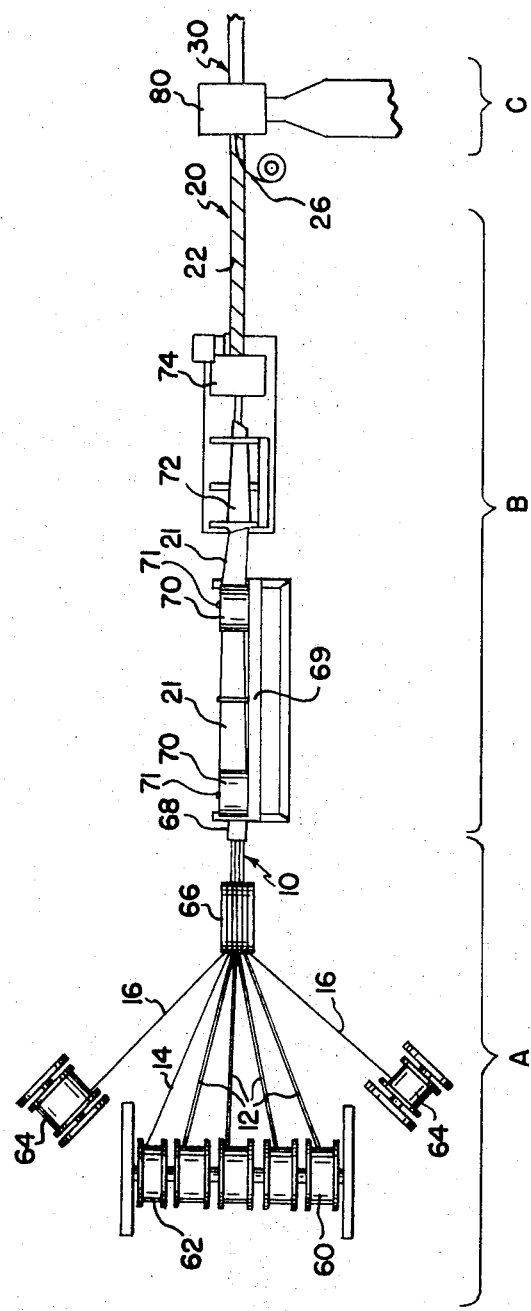
FIG. 4 is a diagramatic illustration showing the first stage of the method for making the composite tubing in accordance with the invention.

In general, and referring again to FIGS. 1 to 3 of the drawings, there is illustrated the flexible composite tubing, designated generally at 1, made in accordance with the invention. In a preferred form, the tubing 1 includes a polymeric core tube bundle 10 for transmitting fluid pressure and an outer insulating and protective jacket 11 which provides improved thermal and shock barrier characteristics for the core tube bundle 10. The jacket 11 generally includes an inner relatively low temperature thermo-barrier layer 20, an intermediate thermo-shock barrier layer 30, an outer relatively high temperature thermo-barrier layer 40 and an outer protective sheath 50, which layers conjunctively coact to provide a predetermined thermal gradient to control the flow of heat energy in a direction toward the interior of the core tube bundle. This thermal gradient is achieved by the selective successive disposition of the layers which have selective thermal and mechanical properties that collectively act to insulate and dissipate heat energy and shock effects away from the interior of the core tube bundle.

In the form shown, the core tube bundle 10 is preferably made from a plurality of individual core tubes 12 arranged in predetermined pattern clusters or bundles, such as in parallel, spiral or the like, relation with respect to the longitudinal central axis of the tubing for transmitting fluid pressure therethrough. For example, the bundles may include from two to thirty-seven tubes having a one-quarter inch outside diameter with a wall thickness of about 0.04 inch. The tubes 12 are preferably made from materials that will maintain internal fluid pressures between about 3 p.s.i. to 100 p.s.i. over extended periods of time while being capable of withstanding work hardening after repeated flexure. The materials for the tubes should have excellent chemical inertness and good burst characteristics related to the desired service temperatures. The materials that may be used preferably include thermoplastic resins, such as polyvinyl chloride, high density polyethylene, low density polyethylene, polyurethane, nylon or the like. In the invention, a preferred material is high density polyethylene of .945 minimum density with a melt index of 0.1 decigram per minute. The preferred burst pressure for this high density material is 200 p.s.i. or above at 200 °F. for one-quarter inch size tubing.

In the embodiment shown, the core tube bundle 10 may also include one or more ribbon-like elements 14 which provide an identification for coding, such as by color or the like, the number and/or arrangement of the core tubes 12 with respect to their pattern within the bundle. In addition, the bundle may be provided with one or more electrical wires 16 for the conveyance of communication signals or the like for the purpose of sensing the continuity characteristics of the tubing during use thereof or the core bundle may comprise such wires where the outer layers are used for jacketing.

In the invention, the inner thermo-barrier layer 20 is preferably applied longitudinally so as to be disposed generally radially with respect to the longitudinal central axis of the core tube bundle 10. In the form shown, the layer 20 preferably includes a plurality of superposed sheets, designated generally at 21, which are wrapped or folded in a predetermined manner around the bundle 10 so as to extend axially or co-directionally (i.e., longitudinally) with respect to the longitudinal central axis of the tubing. Preferably, the sheets are disposed in angularly oriented paired layers (FIGS. 2 and 5) 23, 24, 25, each of which pair may include an outer sheet 23a, 24a, and 25a and an inner sheet 23b, 24b and 25b of generally the same size disposed in superposed relation and generally radially with respect to the central longitudinal axis of the tubing. When an odd number of sheets 21 is employed, it is preferred that the odd sheet be disposed as though it were an additional pair of such sheets.

As best seen in FIGS. 2 and 3, in the longitudinally applied and generally radially disposed position of the sheets 21, the respective sheet pairs 23–25 are disposed in a predetermined overlapped relation adjacent their opposed marginal edges with respect to one another so as to provide a plurality of longitudinally extending overlapped seams 23c, 24c and 25c which complete the closure of the layer 20 around the core tube bundle 10 so as to give a substantially continuous heat energy and fluid barrier therefor.

As best seen in FIG. 3, the seams 23c–25c are formed by overlapping the side edges of the sheets in each of the respective pairs so that the radially outward surfaces of the outer sheets 23a–25a engage the radially inward surfaces of the inner sheets 23b–25b of each of the pairs, respectively. In the invention, this preferred overlapped relation of the paired sheets is achieved by a predetermined wrapping direction or sense (i.e. clockwise or counterclockwise) with respect to the longitudinal central axis of the tubing. For example, it is preferred that when the pair 23 is wrapped in a clockwise direction, that the pair 24 be wrapped in a counterclockwise direction with the pair 25 being wrapped in a clockwise direction so that the sense of direction of the successive pairs 23–25 alternates to provide a circuitous closed path to prevent the ingress of heat energy or fluid toward the core tube bundle. In the invention, it is further preferred that the sheet pairs 23–25 and hence, the corresponding seams 23c–25c be disposed in a predetermined angular orientation with respect to one another and with respect to the longitudinal central axis of the tubing. For example, it is preferred that the seams 23c–25c be disposed in a spaced apart, quadrantal (i.e. 90°) relation around the core tube bundle. Moreover, it is preferred that when two sheet pairs are employed that they be disposed at an angle of 180° with respect to one another and that when a third sheet pair is employed, it be disposed at an angle of 90° with respect to the other two sheet pairs. By this arrangement, the angular disposition of the sheet pairs provides good insulating and protective barrier characteristics for the tubing bundle 10 while at the same time providing uniform thickness and diameter to the final tubing.

On an average basis, it is preferred that the layer 20 include a build-up of at least six sheets. Dimensionally considered, the layer 20 has a thickness of about 10 mils up to several hundred mils with the preferred thickness being about ³⁄₃₂ of an inch. To give such thickness, between about three to six sheets may be employed while five to six sheets are preferred. The sheets 21 may vary in circumferential span according to the size of the core tube bundle 10 and/or to the size of the individual tubes 12. For example, where four tubes 12 are employed, the circumferential span of the sheets may be three inches and when thirty-seven tubes 12 are employed the span may be six inches, as desired.

To hold the sheets 21 of the layer 20 in the longitudinally applied and radially disposed relation around the core tube bundle 10, there is preferably provided a binder strand 22 wihch may be wrapped in a spiral or helical relation around the sheets 21 in the same sense as the outermost sheet pair 25. The strand 22 is preferably made of a polymeric material, such as an 840 denier nylon yarn or the like. The strand is preferably applied with a pitch or lay of about one-half inch to one inch to prevent the sheets from spreading apart. As best seen in FIG. 1, another strand-like element 26 of similar material may be disposed over the strand 22 so as to extend longitudinally or generally parallel to a central longitudinal axis of the tubing. Moreover, in the final assembled condition of the tubing, the strand 26 may be generally loosely disposed between the inner layer 20 and the next adjacent or intermediate layer 30 so as to act as a tear strip to facilitate removal and stripping of the layer 30 from the under supporting layer 20, as desired.

In accordance with the invention, the layer 20 is preferably made from a flexible, lightweight insulating material having low density on high bulk with high thermal insulation characteristics in a relatively low temperature range, such as from ambient temperature to 500° F. Preferably, the layer 20 is selected from a material having a melting point higher than that of the adjacent intermediate layer 30 or from a non-melting (i.e. infusible) material. Moreover, the material of the layer 20 need not, in itself, be capable of adequately insulating the core tube bundle 10 from high external heat energy, but does possess sufficient heat insulating characteristics to insulate and absorb heat energy transferred from the intermediate layer 30. In the invention, preferably the layer 20 is made from high bulk, fibrous sheet material of creped kraft paper having a 50 to 60 pound weight with a stretch of 25 percent. By this arrangement, the creping of the paper sheets provides air spaces or voids therebetween which not only provides optimum heat insulating characteristics, but which also acts as a resilient cushion to absorb the shock effects during use of the tubing. Such material is also substantially impervious to the flow of molten materials, such as upon melting of the intermediate layer 30, so as to prevent the ingress of such molten material toward the core tube bundle. Other insulating materials which may be employed include felt, cork, textile fabric, fiberglass fabric, asbestos paper, asbestos fabric or the like. In addition, the crepe paper, felt or cork may be treated with a flame-retardant for additional flame protection. Such materials may also be treated with an anti-friction agent, such as silicone or the like, to provide a lubricant for the sheets during fabrication of the tubing, as desired.

The intermediate thermo-shock barrier layer 30 is disposed in circumferentially engaged relation around the inner layer 20. The layer 30 is preferably chosen from a material which is heat fusible and self-extinguishing so as to act as a heat-sink by absorbing heat energy by means of a physical state change from a solid phase to a liquid phase without burning or giving off any substantial heat of combustion. Preferably, the layer 30 should be selected from a material with good heat insulating characteristics to retard the flow of heat energy into the core bundle 10 until the material reaches its melting temperature. Moreover, when the material for the layer 30 is selected from a thermoplastic polymeric material, any melting thereof due to minor thermal effects will produce only reversible heat changes without permanently impairing the functional characteristics of the layer. For example, from ambient temperature up to its melting point, such as approximately 300° F., the material of the layer acts as a heat insulator. As the temperature of the layer passes through the melting point, the material commences to absorb external heat energy by a phase transition from a low kinetic energy state (solid phase) to a high kinetic energy state (liquid phase) upon melting thereof. In this molten state, the material is contained against inward penetration by the inner layer 20 and against outward penetration by the outer layer 40 so that the heat effects are dissipated longitudinally along the length of the tubing by heat transfer. In the invention, the layer 30 should preferably have a thickness of at least 10 mils with the preferred thickness being ³⁄₁₆ of an inch. By this arrangement, the material of the layer 30 has good resilient characteristics to cushion or absorb the mechanical shock effects during normal use thereof.

In accordance with the invention, a preferred material for the layer 30 is polyvinyl chloride or the like which may be formed by conventional extruding operations. Such material may have the following physical characteristics:

EXAMPLE

Specific gravity at 23° C. ---------- 1.37.
Hardness at 23° C. ---------------- 89 durometers A.
Tensile strength at 23° C. ---------- 2500 p.s.i.
Elongation at 23° C. -------------- 330%.
Brittleness temperature ---------- −24° C.

Other materials which may be used for the layer 30 include high density polyethylene, low density polyethylene, polyurethane, nylon or the like. Such materials may have suitable flame retardant agents incorporated therein, as desired.

The thermo-barrier outer layer 40 is applied longitudinally in generally radially disposed relation around the intermediate layer 30 and beneath the outer sheath 50 to prevent high heat energy, such as a high velocity flame or the like, from ablating the adjacent intermediate layer 30, thereby to prevent exposure of the inner layer 20 to the direct effects of the heat energy. In the invention, the layer 40 preferably includes a single, longitudinally applied sheet 42 disposed generally radially with respect to the core tube bundle 10 to provide a longitudinally extending seam 44. Moreover, the sheet is applied and disposed in overlapping relation in a manner similar to that of the application and disposition of the paired sheets 21 of the inner layer 20. Here again, the sheet may be applied with a predetermined clockwise or counterclockwise sense with the opposed marginal edges being overlapped between about ⅜ inch to ½ inch. As to circumferential span, the sheet 42 preferably has a span of approximately 4¾ inches for a core tube bundle with four tubes 12 and approximately 7¾ inches for a thirty-seven tube bundle. The thickness of the layer 40 should preferably be at least 5 mils.

Preferably, the layer 40 should be made from a flexible, insulating and refractory material which is substantially infusible to provide superior flame resistant characteristics at a relatively high temperature range, such as between about 2000° F. to 3000° F., and which is capable of deflecting large quantities of heat energy away from the interior of the core tube bundle 10. Moreover, the layer 40 should preferably be made from a relatively high melting point material as compared to that of the intermediate layer 30 so as to act as a dam to contain the molten material of the layer 30 upon melting thereof. Preferably, the layer is of a laminated construction, such as asbestos-Mylar (a trade name of E. I. du Pont de Nemours & Co.). In this form, it is preferred that the asbestos of the laminate have a thickness of 30 mils with the Mylar having a thickness of one mil with the latter being disposed on the radially outward side of the layer 40 to enhance the strength characteristics thereof. Moreover, the layer 40 may not necessarily be of a laminated construction for in some cases the asbestos material may be employed alone. Accordingly, other insulating and refractory materials which may be employed include fiberglass fabric, asbestos paper, asbestos fabric or the like. In addition, other materials, such as creped paper, felt, cork, textile fabric or the like which have been treated with a flame retardant, may also be employed, as desired.

As best seen in FIG. 1, the sheet 42 is preferably held in its longitudinally applied relation by another binder strand 46 which is preferably helically disposed with a pitch or lay of between about one-half inch to one inch. The strand 46 is preferably wrapped in a helical or spiral direction corresponding to that of the application of the sheet 42. The strand is preferably made from a polymeric material, such as 840 denier nylon yarn. Here again, to facilitate removal of the outer sheath 50, a second longitudinally extending strand 48 may be provided in the manner of the strand 26 to act as a tear strip for the tubing.

In the embodiment shown, the outer sheath 50 which is disposed in encompassing relation around the thermobarrier layer 40 acts to provide a protective covering for the tubing so as to protect the same from abrasion, moisture and chemical environmental effects. Under the effect of external heat energy, the sheath 50 absorbs heat energy and melts off, thereby ablating and protecting the tubing from the initial effects of a high temperature flame source or the like. The material for the sheath is preferably of a heat-fusible, resilient polymeric material which has self-extinguishing characteristics. A preferred material for the sheath may include polyvinyl chloride which incorporates the aforementioned characteristics with relation to the intermediate shock-barrier layer 30. Other materials which may be employed include high density polyethylene, low density polyethylene, polyurethane, nylon or the like. These materials may be treated with a flame retardant to resist the initial high temperature effects from a flame source or the like. The sheath may be extruded from the above materials and preferably has a thickness of at least 5 mils with the preferred thickness being 1/16 inch.

Figure 5:
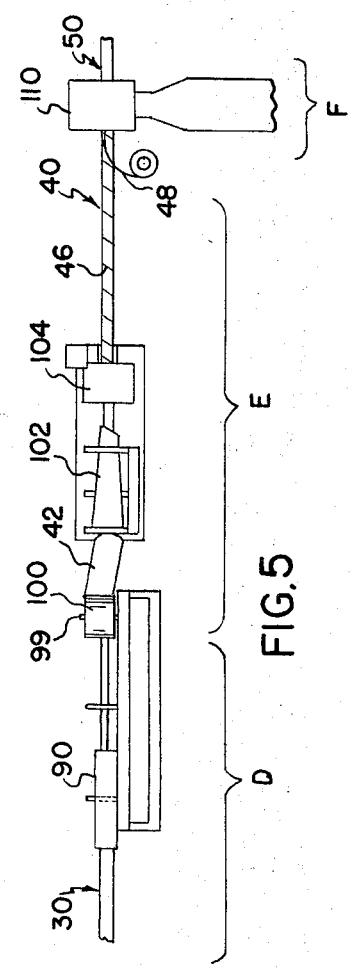
FIG. 5 is a diagrammatic illustration showing the second stage of the method for making the composite tubing in accordance with the invention.

In FIGS. 4 and 5, there is illustrated a preferred apparatus system for producing the tubing in accordance with the method of the present invention. It will be seen that the method may be carried out semi-continuously in a first stage (FIG. 4) and in a second stage (FIG. 5) or continuously, as desired.

At the commencement of the operation, the core tube bundle is initially formed so as to act as a carrier support or a substrate for the outer insulating and protective jacket 11. As shown at A in FIG. 4, the individual core tubes 12 are delivered from a series of supply reels 60 through a common alignment guide 66 which brings the tubes into generally parallel alignment with one another. From the guide 66 the tubes 12 are fed through an index guide 68 which gathers the tubes together in bundled relation in accordance with a predetermined identification code pattern and shape dependent upon the number and/or size of the tubes. In this connection, the identification ribbon 14 and communication wires 16 may be applied to the bundle 10 from other supply reels 62 and 64 which feed such elements simultaneously through the guides 66 and 68 for alignment with the tubes 12.

The inner thermo-barrier layer 20 may then be applied to the core tube bundle 10, as shown at B. From the guide 68, the bundle 10 is fed to a support rack 69 which mounts a plurality of supply reels 70 which carry the sheets 21 in roll form thereon. For example, where a core bundle including four core tubes 12 is employed, the two reels 70 shown may be disposed on top of the bundle while another two or three reels (not shown) may be disposed below the bundle to apply the proper number of sheet pairs, such as 23, 24 and 25, to the bundle. As shown, the rotational axes of the reels 71 are preferably disposed at right angles with respect to the longitudinal central axis of the bundle so as to deliver the sheets 21 co-directionally in the general direction of movement of the bundle. The leading portions of the sheet pairs may then be fed one at a time through fold-up guides 72 which may be telescopingly disposed in angularly off-set relationship with respect to one another to sequentially fold the sheets in circumferentially engaged relation around the bundle 10 and in angularly off-set relation with respect to one another. The guides 72 act to progressively fold the sheets out of their normal planar disposition over and around the bundle in a direction from their leading portions toward their following portions until the respective sheets are completely disposed in circumferentially enveloped relation around the bundle. As the sheets are passed through the guides 72 they are compressed radially inwardly into tight enveloping engagement around the bundle.

From the guides 72 the core tube bundle 10 mounting the sheets 21 is fed through a binder head 74 where a binder strand 22 is wound helically around the sheets 21 at a predetermined pitch or lay to hold the sheets in place. The strand 22 is preferably helically disposed with the same directional sense as the outermost of the sheets 21. After such binding, the aforementioned strand 26 may then be applied longitudinally along the exterior of the sheets and over the binder strand 22 to facilitate removal of the thermo-shock barrier layer 30, as aforesaid.

As shown at C, the layer 30 is formed by extruding the polymeric heat fusible material from a crosshead extruder 80 around the inner layer 20. After the extrusion step, the tubing is partially assembled to include the core bundle 10, the thermo-barrier layer 20 and the thermo-shock barrier 30 which provides a "core stock" which can be readily stored for subsequent operations, as desired.

From the extruder head 80, the core stock may be delivered from a supply source (not shown) or continuously fed from the head 80 through an alignment guide 90 (FIG. 5), as at D. From the guide 90, the core stock is delivered past another supply reel 100 which mounts a roll of the insulating and refractory material 42. Here again, the rotational axis of the reel 99 is disposed at a right angle with respect to the direction of movement of the sheet 42 which is fed through another fold-up guide 102, as at E. Like the guides 72, the guide 102 acts to fold the sheet progressively around the adjacent intermediate layer 30 in a direction from the leading portions of the sheet 42 toward its rearward portions so as the sheet exits from the guide, it is disposed in predetermined (clockwise or counter-clockwise) circumferential relation around the core stock. In this form, it is preferred that the Mylar side of the asbestos laminate face away from the substrate (i.e. layer 30) so as to lend lubricity thereto upon movement through the guide 102. Moreover, as the sheet 42 exits from the guide 102, it is compressed tightly around the layer 30 for subsequent operations. After leaving the guide 102, another binder head 104 acts to wrap a binder strand 46 in helical relation around the sheet 42 and in the same sense of direction as the side edges of the sheet are overlapped. For example, if the sheet is wrapped in a counter-clockwise direction, the strand 46 would be applied in the same direction for holding the sheet in its overlapped position. Here again, another strand 48 may be applied longitudinally over the strand 46 to provide a tear strip for removal of the outer sheath 50. As shown at F, the polymeric sheath 50 is then extruded over the layer 40 from another crosshead 110 to provide the finished tubing product.

By the foregoing arrangement, there is provided an efficient method for semi-continuously or continuously providing the flexible composite tubing of the invention.

Moreover, in the first stage A to C the core stock may be finished for intermediate usage and/or storage or moved directly to the end through the second stage D to F for completion, as desired. By this method, longer continuous lengths of tubing can be produced which are less expensive, but which are quicker and easier to produce without the use of complex and space consuming equipment heretofore required to produce other tubing for similar applications. This method is also adapted for providing an improved jacket for use with a core bundle of tubing, wire or the like.

What is claimed is:

1. A flexible composite tubing having improved flame and heat resistant characteristics comprising, an inner core tube structure adapted for transmitting fluid pressure and an outer jacket structure disposed around said core tube structure and providing a thermal control gradient therefor, said jacket structure including an inner thermo-barrier layer means disposed around said core tube structure, an intermediate thermo-shock barrier layer means disposed around said inner layer means, and an outer thermo-barrier layer means disposed around said intermediate layer means, and said intermediate layer means made from a heat absorbent and substantially heat fusible material adapted to absorb heat energy by phase transition from a low energy condition to a higher energy condition upon transfer of heat energy from said outer layer means toward said inner layer means.

2. A composite tubing in accordance with claim 1, wherein said inner layer means is made from a heat insulating material which is substantially heat infusible at a temperature in excess of said phase transition temperature.

3. A composite tubing in accordance with claim 1, wherein said inner layer means is made from a generally low density on high bulk material which has relatively high thermal insulation characteristics at a relatively low temperature.

4. A composite tubing in accordance with claim 2, wherein said inner layer means includes a plurality of longitudinally applied layers disposed in a predetermined circumferential overlapped relation around said core tube structure.

5. A composite tubing in accordance with claim 4, wherein each of said layers comprises a pair of sheets disposed in superposed relation with respect to each other, and each of said sheet pairs being disposed in a predetermined angular oriented position with respect to one another and with respect to the longitudinal central axis of said tubing.

6. A composite tubing in accordance with claim 5, including a strand-like element disposed in generally helical relation around the outermost of said sheet pairs for holding said layers in said angularly oriented position.

7. A composite tubing in accordance with claim 6, including another strand-like element extending generally longitudinally over said first-mentioned strand-like element and between the outermost of said sheet pairs and said intermediate layer means adapted to act as a tear strip to facilitate removal of said intermediate layer means.

8. A composite tubing in accordance with claim 4, wherein said layers are each made from a fibrous insulating material having refractory flame and heat resistant characteristics at a temperature in excess of 2000° F.

9. A composite tubing in accordance with claim 1, wherein said intermediate layer means includes a layer made from a flexible polymeric material having relatively low temperature transition characteristics.

10. A composite tubing in accordance with claim 9, wherein said intermediate layer has a wall thickness substantially greater than that of said outer layer means.

11. A composite tubing in accordance with claim 1, wherein said outer layer means is made from a heat insulating material having relatively high refractory and flame resistant characteristics as compared to said inner and intermediate layer means.

12. A composite tubing in accordance with claim 11, wherein said outer layer means includes a longitudinally applied layer of said material disposed in a predetermined circumferential overlapped relation around said intermediate layer means.

13. A composite tubing in accordance with claim 12, including a strand-like element disposed in generally helical relation around said layer for holding said layer in said circumferential overlapped relation with respect to said intermediate layer means.

14. A composite tubing in accordance with claim 13, including an outer polymeric sheath disposed around said layer and providing a protective cover for said tubing, and another strand-like element extending generally longitudinally over said first-mentioned strand-like element and between said layer and said outer sheath adapted to act as a tear strip to facilitate removal of said sheath.

15. A composite tubing in accordance with claim 12, wherein said layer comprises a polymeric-asbestos laminate.

16. A flexible jacket structure having improved flame and heat resistant characteristics adapted to be applied around a core structure to provide a thermal control gradient therefor, said jacket structure comprising, an inner thermo-barrier layer means adapted to be disposed around said core structure, an intermediate thermo-shock barrier layer means disposed around said inner layer means, said intermediate layer means made from a heat absorbent and substantially heat fusible material adapted to absorb heat energy by phase transition from a low energy condition to a higher energy condition upon transfer of heat energy from said outer layer means toward said inner layer means.

References Cited
UNITED STATES PATENTS

| | | | |
|---|---|---|---|
| 2,578,280 | 12/1951 | Barnard | 138—111 X |
| 3,269,422 | 8/1966 | Matthews et al. | 138—111 |
| 3,400,737 | 9/1968 | Matthews et al. | 138—111 |

LOUIS K. RIMRODT, Primary Examiner